(12) United States Patent
Matsushita et al.

(10) Patent No.: US 11,915,883 B2
(45) Date of Patent: *Feb. 27, 2024

(54) ELECTRET

(71) Applicants: DENSO CORPORATION, Kariya (JP); TOKYO UNIVERSITY OF SCIENCE FOUNDATION, Tokyo (JP)

(72) Inventors: Noriyuki Matsushita, Kariya (JP); Yoshihiro Kozawa, Kariya (JP); Kazuhiko Kanoh, Kariya (JP); Yumi Tanaka, Tokyo (JP); Hirotoshi Otsuka, Tokyo (JP); Yuki Kotaka, Tokyo (JP)

(73) Assignees: DENSO CORPORATION, Kariya (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 581 days.

This patent is subject to a terminal disclaimer.

(21) Appl. No.: 17/116,204

(22) Filed: Dec. 9, 2020

(65) Prior Publication Data
US 2021/0183584 A1 Jun. 17, 2021

(30) Foreign Application Priority Data
Dec. 13, 2019 (JP) .................. 2019-225736

(51) Int. Cl.
*H01G 7/02* (2006.01)
*C01F 17/34* (2020.01)
*C01B 25/32* (2006.01)

(52) U.S. Cl.
CPC ............. *H01G 7/025* (2013.01); *C01B 25/32* (2013.01); *C01F 17/34* (2020.01); *C01P 2002/34* (2013.01); *C01P 2006/40* (2013.01)

(58) Field of Classification Search
CPC ........ H01G 7/025; H01G 7/021; H01G 7/026; H01G 7/028; C01B 25/32; C01F 17/34;
(Continued)

(56) References Cited

U.S. PATENT DOCUMENTS 6,573,205 B1 6/2003 Myers et al.
6,759,356 B1 7/2004 Myers
(Continued)

FOREIGN PATENT DOCUMENTS

JP 5563746 B2 10/2009
JP 6465377 B2 2/2016
(Continued)

OTHER PUBLICATIONS

U.S. Appl. No. 17/116,099, filed Dec. 9, 2020, Matsushita et al.
U.S. Appl. No. 17/116,217, filed Dec. 9, 2020, Kozawa et al.

*Primary Examiner* — Andrew J. Oyer
(74) *Attorney, Agent, or Firm* — POSZ LAW GROUP, PLC

(57) ABSTRACT

An electret includes an electret layer. The electret layer is formed by subjecting a composite film in which inorganic dielectric particles are dispersed and held in a base film to a polarization treatment. The inorganic dielectric particles are mainly composed of an inorganic dielectric material having a bandgap energy of 4 eV or more.

9 Claims, 2 Drawing Sheets

(58) Field of Classification Search
CPC .............. C01P 2002/34; C01P 2006/40; C01P 2002/54; C01P 2004/61
See application file for complete search history.

(56) References Cited

U.S. PATENT DOCUMENTS

| | | |
|---|---|---|
| 2003/0207642 A1 | 11/2003 | Myers et al. |
| 2006/0113862 A1 | 6/2006 | Suzuki et al. |
| 2009/0051242 A1 | 2/2009 | Suzuki et al. |
| 2021/0183584 A1* | 6/2021 | Matsushita ............. C01B 25/32 |
| 2021/0184100 A1* | 6/2021 | Matsushita ............ H01G 7/025 |

FOREIGN PATENT DOCUMENTS

| | | |
|---|---|---|
| JP | 2017-162906 A | 9/2017 |
| WO | 2012/073465 A1 | 6/2012 |

* cited by examiner

ELECTRET

CROSS REFERENCE TO RELATED APPLICATION

The present application claims the benefit of priority from Japanese Patent Application No. 2019-225736 filed on Dec. 13, 2019. The entire disclosure of the above application is incorporated herein by reference.

TECHNICAL FIELD

The present disclosure relates to an electret.

BACKGROUND

As an energy harvesting technology that converts energy existing in the environment into electric power, practical application of a vibration power generation element or the like using an electret has been studied.

SUMMARY

The present disclosure provides an electret including an electret layer. The electret layer is formed by subjecting a composite film in which inorganic dielectric particles are dispersed and held in a base film to a polarization treatment. The inorganic dielectric particles are mainly composed of an inorganic dielectric material having a bandgap energy of 4 eV or more.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
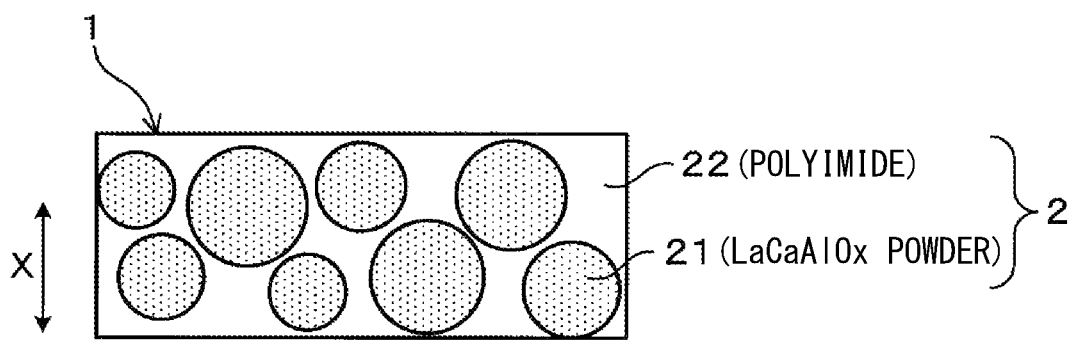
FIG. 1 is a schematic view showing an electret layer which is a schematic configuration example and a basic structure of an electret according to a first embodiment.

An organic polymer material such as a fluororesin is generally used as a constituent material of the electret. For example, a chain-like fluororesin or a polymer having a fluoroaliphatic ring structure in a main chain is used.

While the organic polymer material has advantages such as shape freedom and excellent controllability of film thickness in thin film formation, there are concerns about a thermal stability of a surface potential and a deterioration of performance over time in a high temperature environment because of being an organic matter. On the other hand, there may be an electret in which metal oxide fine particles having a relative permittivity of 2.0 to $4.0 \times 10^3$ are mixed to an organic polymer having a polar functional group at the end of a main chain or a side chain at a volume fraction of 0.02% by volume or more and less than 10% by volume so as to have an improved thermal stability.

On the other hand, it has been studied to form an electret using an inorganic compound material having excellent stability at high temperatures. For example, an electret material may use a sintered body having a crystal structure of hexagonal hydroxyapatite and having a hydroxide ion content lower than that of hydroxyapatite having a stoichiometric composition. This sintered body can be obtained by sintering and dehydrating a molded product made from hydroxyapatite powder at a temperature of higher than 1250° C. and lower than 1500° C., and it is considered that a high surface potential can be expressed after a polarization treatment due to defects of hydroxide ions.

By incorporating a power generation element or the like using an inorganic electret into an integrated circuit or the like formed on a substrate, a power generation device can be miniaturized and used in a high temperature environment, and is expected to be applied to various uses. However, if the electret material is a bulk sintered body using a powder raw material, it is difficult to apply it on a substrate of a device. Alternatively, it is possible to form a thin film using a film forming apparatus, but in that case, not only it takes time to form a film, but also the range of controllable film thickness is limited. If the electret material is mainly composed of an organic polymer, the controllability of the film thickness is improved, but the thermal stability is not sufficient, and there is concern about deterioration in performance over time when used in a high temperature environment.

An electret according to an aspect of the present disclosure includes an electret layer. The electret layer is formed by subjecting a composite film in which inorganic dielectric particles are dispersed and held in a base film to a polarization treatment. The inorganic dielectric particles are mainly composed of an inorganic dielectric material having a bandgap energy of 4 eV or more.

An electret according to another aspect of the present disclosure includes a substrate and an electret layer formed above a surface of the substrate. The electret layer is formed by subjecting a composite film in which inorganic dielectric particles are dispersed and held in a base film to a polarization treatment, and the inorganic dielectric particles are mainly composed of an inorganic dielectric material having a bandgap energy of 4 eV or more.

In the electrets having the above structures, the composite film is used for the electret layer, and the inorganic dielectric particles, which have an electret performance by the polarization treatment, are dispersed in the base film, so that the film thickness of the electret layer formed above the substrate can be easily controlled, and the degree of freedom in shape is improved. Further, since the inorganic dielectric particles are made of the inorganic dielectric material having a high bandgap energy of 4 eV or more, the dielectric breakdown voltage can be increased, and a high surface potential can be obtained by applying a high voltage during the polarization treatment. Therefore, it is possible to obtain an electret that is thermally stable and is less likely to cause a decrease in surface potential due to high temperature environment or long-term use.

As described above, according to the above aspects, it is possible to provide the electrets that are thermally stable, easily controllable in film thickness, and suitable for use in a high temperature environment.

First Embodiment

An electret according to a first embodiment will be described with reference to FIGS. 1 to 3. As shown in FIG.

1, the electret 1 of the present embodiment has an electret layer 2 as a basic structure. The electret layer 2 is formed by subjecting a composite film in which inorganic dielectric particles 21 are dispersed and held in a base film 22 to a polarization treatment, and the inorganic dielectric particles 21 are particles mainly composed of an inorganic dielectric material having a bandgap energy of 4 eV or more.

Figure 2:
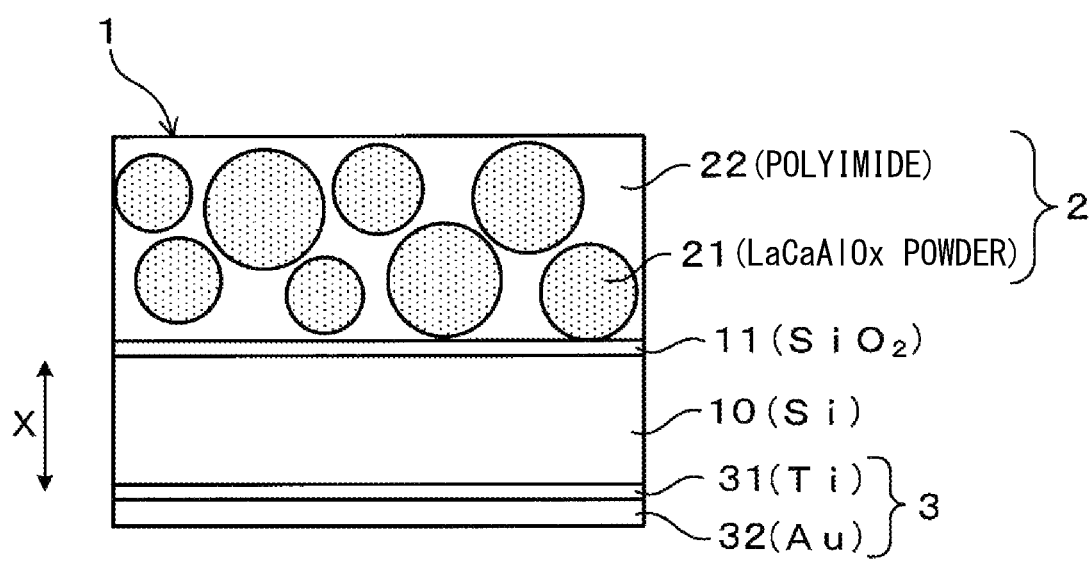
FIG. 2 is a schematic view showing another schematic configuration example of an electret according to the first embodiment.

As shown in FIG. 2, the electret 1 of the present embodiment can have a configuration including a substrate 10 and an electret layer 2 formed above a surface of the substrate 10. As shown in FIG. 1 as the basic structure, the electret layer 2 is formed by subjecting a composite film in which inorganic dielectric particles 21 are dispersed and held in a base film 22, and the inorganic dielectric particles 21 are particles mainly composed of an inorganic dielectric material having a gap energy of 4 eV or more. Here, the term "particles mainly composed of an inorganic dielectric material" means that the particles may be composed only of the inorganic dielectric material, the particles may contain impurities due to the raw material of the inorganic dielectric material, or some other components may be added to the inorganic dielectric material during a process of making the inorganic dielectric material into the particles. Further, the electret 1 (that is, the electret layer 2) shown in FIG. 1 is, for example, a state in which the electret layer 2 in the electret 1 shown in FIG. 2 has been peeled off from the substrate 10.

The electret 1 is a charged substance that provides an electrostatic field in the surroundings, and the surface potential is expressed by the electret layer 2 in which the composite film containing the inorganic dielectric particles 21 is polarized. The inorganic dielectric particles 21 are held in the base film 22 and are uniformly dispersed, so that the electret layer 2 having stable characteristics can be formed.

Since the electret layer 2 uses the inorganic dielectric material having a relatively large bandgap energy of 4 eV or more for the inorganic dielectric particles 21, and the breakdown voltage becomes large, the electret layer 2 can express a desired high surface potential by being applied with a high voltage during the polarization treatment. Further, since the electret layer 2 is composed of the composite film in which the inorganic dielectric particles 21 are dispersed in the base film 22 suitable for film formation, film formation and film thickness control according to the shape of the substrate 10 are easy, and the electret 1 can have excellent shape flexibility and thermal stability.

The electret 1 is used, for example, as an integrated circuit built-in power generation element in various devices that mutually convert mechanical energy and electrical energy, for example, in a small electrostatic vibration power generation device that uses environmental vibration as a power source.

The electret 1 has any outer shape according to the shape of the substrate 10 (for example, a rectangular flat plate shape or a disk shape), and the electret layer 2 is laminated and formed above one surface of the substrate 10. Here, the vertical direction in the drawing is defined as a thickness direction X of the substrate 10, the surface above which the electret layer 2 is laminated is referred to as an upper surface, and the surface on the opposite side is referred to as a lower surface.

The constituent material of the inorganic dielectric particles 21 is not particularly limited as long as it is an inorganic dielectric material having a bandgap energy of 4 eV or more. Preferably, as such an inorganic dielectric material, a composite oxide having an $ABO_3$ type perovskite structure containing two different metal elements A and B is used. In the present embodiment, the electret layer 2 using a composite oxide having a perovskite structure will be mainly described below.

The composite oxide having the perovskite structure is a composite oxide having a perovskite-type crystal structure represented by the composition formula $ABO_3$, and typically has a cubic unit cell. The metal element A is located at a center position of a cubic crystal, the metal element B is located at each vertex of the cubic crystal, and an oxygen atom O is coordinated with respect to each of the metal elements A and B in a regular octahedron. In the perovskite structure, the composite oxide often has a non-stoichiometric composition due to the lack of oxygen atoms. In that case, the composite oxide can be expressed by the composition formula $ABO_x$ ($x<3$), and crystal defects occur because the amount of oxygen is smaller than the stoichiometric ratio. It is preferable that a configuration in which the amount of oxygen is smaller than the stoichiometric ratio, which contributes to the improvement of the surface potential.

In the electret layer 2, the inorganic dielectric particles 21 used as the inorganic dielectric material are composed of composite oxide particles having a perovskite structure represented by the composition formula $ABO_3$ as a basic composition. The combination of the metal elements A and B in the composition formula $ABO_3$ is not particularly limited, but for example, a rare earth aluminate ($RAO_3$) in which a trivalent rare earth element R (metal element A) and a trivalent Al (metal element B) are combined is preferably used.

As a specific example, in the $ABO_3$ type perovskite structure, the A site (metal element A) may be occupied by a rare earth element R selected from the group consisting of La, Y, Pr, Sm and Nd, and the B site (metal element B) may be occupied by Al. The rare earth aluminate in which these components are combined has a large bandgap energy of 4 eV or more and a relatively small relative permittivity (for example, 100 or less), so that a high surface potential can be realized. In addition, the rare earth aluminate can be manufactured using a relatively inexpensive material, which is advantageous in terms of manufacturing cost.

The composite oxide constituting the inorganic dielectric particles 21 may have a composition in which at least one of the A site (metal element A) and the B site (metal element B) in the perovskite structure is substituted with a dopant different from the metal elements A and B. When a metal element having a lower valence than the metal elements A and B is used as the dopant element, oxygen defects are likely to be introduced into the crystal structure.

For example, when the A site is the above-described trivalent rare earth element R, the dopant element can be a divalent alkaline earth metal element (including Mg) that occupies a part of the A site. Examples of such a divalent alkaline earth metal element include Ca and Sr.

Alternatively, when the B site is the above-described trivalent Al, the dopant element is one or more selected from the divalent alkaline earth metal elements (including Mg) and Zn that occupies a part of the B site. Of course, a part of both the A site and the B site may be substituted with the dopant elements.

By adopting a composition in which a part of the metal elements A and B constituting the composite oxide is substituted in this way, it becomes easy to introduce oxygen defects. In order to obtain a high surface potential in the electret layer 2, the presence of defects in the inorganic dielectric material is considered to be important. By using the material having the perovskite structure for the inorganic dielectric particles 21, the amount of defects can be easily controlled by element substitution.

The substitution ratio of the dopant element that substitutes for the metal element A can be appropriately set in the range of, for example, 0.5 atomic % to 20 atomic %. Similarly, the substitution ratio of the dopant element that substitutes for the metal element B can be appropriately set in the range of, for example, 0.5 atomic % to 20 atomic %, and a desired high surface potential according to the substitution ratio can be obtained. In this way, defects can be generated by introducing the dopant element, and by controlling the substitution ratios of the metal elements A and B, the amount of defects can be controlled and stable surface potential characteristics can be obtained.

The electret layer 2 is composed of a composite film formed on the substrate 10 using a material obtained by preparing such a composite oxide into particles to form inorganic dielectric particles 21 and mixing the inorganic dielectric particles 21 with a base material to be the base film 22. The base material may be an organic material or an inorganic material that can be uniformly mixed with the inorganic dielectric particles 21 and formed into a film having a predetermined thickness, and is excellent in heat resistance and withstand voltage.

Preferably, the base film 22 may have heat resistance and withstand voltage resistance required according to the conditions of the polarization treatment described later. It is desirable that the base film 22 is composed of a material that is stable at the temperature during the polarization treatment, has a melting point or thermal decomposition temperature (for example, 200° C. or higher) higher than the temperature during polarization treatment, and has a dielectric breakdown electric field strength (for example, 4 kV/mm or more) higher than the electric field strength during the polarization treatment.

As such a base material, for example, an organic material such as polyimide, silicon resin, polyamideimide, allyl resin, and fluororesin, or an inorganic material such as sodium silicate can be used. In addition, any liquid material capable of forming a film, such as glassy SOG (spin-on glass) containing silicon and silicon resin, can be used.

The material of the substrate 10 is not particularly limited. In the present embodiment, for example, a conductive Si substrate is used. As the substrate 10, conductive substrates using conductive oxides and metals such as aluminum, iron, and copper, and insulating substrates using quartz glass, soda glass, sapphire, PP (polypropylene), PET (polyethylene terephthalate), and polycarbonate can also be used.

The composite film to be the electret layer 2 can be formed above the substrate 10 by any method such as a printing method, a dispensing method, a casting method, and a spin coating method. For example, in the case of the printing method, a liquid material containing the inorganic dielectric particles 21 and the base material is applied by printing on the substrate 10 to have a desired film thickness, and is dried and thermoset so as to be a composite film having the desired thickness.

By forming the electret layer 2 in a film structure in which the inorganic dielectric particles 21 are dispersed in the base material film 22 in this way, it is easier to form the electret layer 2 expressing a high surface potential on the substrate 10 without using a film forming apparatus or the like that requires high temperature and high vacuum conditions. The electret layer 2 can have any film thickness, and a composite film (for example, 10 μm or more) thicker than the film thickness formed by a normal film forming apparatus can be easily formed.

In the composite film to be the electret layer 2, the volume ratio of the inorganic dielectric particles 21 can be appropriately adjusted so as to obtain a desired surface potential and a desired film strength. Preferably, the volume ratio of the inorganic dielectric particles 21 is set to be in the range of 30% by volume or more and 75% by volume or less. As the volume ratio of the inorganic dielectric particles 21 increases, a larger surface potential can be obtained and the strength of the composite film also improves. Further, by using spherical particles as the inorganic dielectric particles 21, it becomes easier to control the film thickness. In that case, since a close-packed structure is formed at 75% by volume, a larger surface potential can be obtained by setting this as the upper limit, and the strength of the composite film can be ensured without lowering a holding capacity of the inorganic dielectric particles 21.

The electret 1 is obtained by subjecting the composite film to the polarization treatment in a state where the composite film is formed above the upper surface of the substrate 10. Therefore, it is desirable that a conductive layer 3 is arranged on the lower surface of the substrate 10 which is opposite to the electret layer 2 in the thickness direction X. The conductive layer 3 is made of a conductive film formed by using a conductive metal such as Ti, Au, and Pt, and may have a structure in which a plurality of conductive films are laminated. By using the conductive layer 3 as an electrode during the polarization treatment, the composite film can be polarized to form the electret layer 2.

In the electret 1 shown in FIG. 2, the conductive layer 3 having a two-layer structure is formed on the lower surface of the substrate 10 made of conductive Si. A first conductive layer 31 in contact with the lower surface of the substrate 10 is made of a metal such as Ti having good adhesion, and a second conductive layer 32 in contact with a lower surface of the first conductive layer 31 is a noble metal having good conductivity (for example, Pt, Au, etc.). There is a Si oxide film 11 on the upper surface of the substrate 10, and the electret layer 2 is arranged in contact with an upper surface of the the Si oxide film 11.

The polarization treatment method is not particularly limited, and is performed by, for example, using corona discharge or the like to apply a voltage between the conductive layer 3 serving as a ground electrode and a counter electrode. As for the polarization treatment conditions, for example, it is desirable to apply a voltage at a temperature of 100° C. or higher so that the electric field strength becomes 1 kV/mm or higher, preferably 4 kV/mm or higher. In order to realize efficient power generation as a device, for example, for vibration power generation, a surface potential of 400 V or more is required. For example, in the case of an electret layer 2 having a film thickness of 100 μm, a desired surface potential can be achieved by a polarization treatment with an electric field strength of 4 kV/mm or more.

Since the surface potential of the electret layer 2 after the polarization treatment is proportional to a voltage applied to the composite film formed on the substrate 10, it is necessary to apply a voltage capable of realizing the surface potential required according to the application. Alternatively, the film thickness may be increased according to the required voltage so that dielectric breakdown does not occur.

Since the electret layer 2 formed above the substrate 10 is mainly composed of the inorganic material, the electret 1 produced in this manner has higher durability in use in a high temperature environment and has a higher surface potential while suppressing deterioration of performance over time compared with an electret made of an organic material.

Example 1

The electret 1 having the configuration shown in FIG. 2 was produced by the following method.

<Solution Preparation>

First, in order to form the composite film to be the electret layer 2, lanthanum oxide ($La_2O_3$), aluminum oxide ($Al_2O_3$), and calcium carbonate ($CaCO_3$) powders as raw materials for the inorganic dielectric material were blended so that a molar ratio of La, Al, and Ca became 99:100:1, and were sufficiently mixed to obtain a mixture. The mixture was heated and sintered at 1600° C. for 2 hours to prepare a sintered powder of lanthanum aluminate-based composite oxide $La_{0.99}Ca_{0.01}AlO_x$ (hereinafter, LAO-based sintered powder). The obtained sintered powder was sufficiently pulverized so that the average particle size was about 50 μm to obtain the inorganic dielectric particles 21.

Next, an organic mixed solution of N-methyl-2-pyrrolidone and polyamic acid was prepared as a raw material for the base material to be the base film 22 so that the polyamic acid concentration was about 6%. The LAO-based sintered powder to be the inorganic dielectric particles 21 was added to the organic mixed solution in an amount of 30% by mass and mixed to prepare a powder mixed solution for forming the composite film.

<Film Formation>

The upper surface of the substrate 10 made of conductive Si was thermally oxidized to form the Si oxide film 11 having a film thickness of 50 nm. Next, the conductive layer 3 was formed on the lower surface of the substrate 10 by a sputtering method. The conductive layer 3 was formed by forming a Ti film of 30 nm, which is the first conductive layer 31, and an Au film of 200 nm, which is the second conductive layer 32, in order from the side in contact with the substrate 10, using metal materials forming respective layers as targets.

Next, the powder mixed solution prepared as described above was applied to the upper surface of the Si oxide film 11 on the substrate 10 by a printing method so as to have a thickness of about 160 μm. When the LAO-based sintered powder precipitates downward after the application, an upper organic mixed solution without the LAO-based sintered powder was removed, if necessary. The volume ratio of the LAO-based sintered powder after the formation of the electret layer 2 was 70% by volume.

Then, the substrate 10 applied with the powder mixed solution was dried at 110° C. for 15 minutes in an air atmosphere. Further, the polyamic acid was made polyimide by heat treatment at 280° C. for 1 hour. As a result, an organic-inorganic composite film is formed in a state where the inorganic dielectric particles 21 made of LAO-based sintered powder having a perovskite structure were surrounded and held by the base material made of polyimide (thermal decomposition temperature ≥500° C.) and uniformly dispersed in the base material film 22. The temperature rising rate during the heat treatment was 3° C./min.

<Polarization Treatment>

The organic-inorganic composite film to be the electret layer 2 was formed above the substrate 10 as described above and was subjected to a polarization treatment to obtain the electret 1. A corona discharge is used for the polarization treatment, the conductive layer 3 in contact with the lower surface of the substrate 10 is grounded to be a ground electrode, the corona discharge electrode is arranged on the upper surface of the electret layer 2, and a negative voltage is applied to cause the corona discharge. The conditions for the corona discharge were as follows. The voltage was applied and the corona discharge was continued even when the temperature was lowered.

Discharge voltage: −6 kV
Temperature: 200° C.
Processing time: 1 hour

As a result, the organic-inorganic composite film formed above the substrate 10 was polarized and negatively charged on the upper surface, so that the electret layer 2 having electret performance could be obtained. At this time, a high surface potential corresponding to the polarization treatment conditions can be obtained, and by performing the polarization treatment temperature at a temperature (for example, 200° C.) higher than room temperature, the fluctuation of the surface potential can be suppressed even in applications where the usage environment becomes high. This makes it possible to realize stable electret performance. The temperature and other conditions of the polarization treatment can be appropriately changed depending on the melting point of the constituent material of the organic-inorganic composite film, the characteristics required in the assumed usage environment, and the like.

In the electret 1 of Example 1, lanthanum aluminate ($LaAlO_3$), which is a typical composition of the LAO-based inorganic dielectric material constituting the inorganic dielectric particles 21 has a bandgap energy of 5.6 eV, and a surface potential of a polycrystal having a thickness of 1 mm was 4000 V (electric field strength during polarization of 1 kV/mm or more). ($La_{0.99}Ca_{0.01}AlO_x$) in which a part of Al is substituted with Ca, which is a dopant element, also had almost the same bandgap energy, and the bandgap energy of ($La_{1-y}Ca_yAlO_{3-\delta}$) in which the substitution ratio y of Ca was changed in the range of 0.5 atomic % to 20 atomic % was also almost the same. The surface potentials of ($La_{1-y}Ca_yAlO_{3-\delta}$) formed into polycrystals having a thickness of 1 mm were 1000 V to 3500 V (electric field strength during polarization of 1 kV/mm or more).

For other rare earth aluminates, the bandgap energies in typical compositions are shown below. Even when a part of metal elements of these rare earth aluminates are substituted, they have almost the same bandgap energy. A surface potential of $YAlO_3$ when formed into a polycrystal with a thickness o 1 mm was 1000 V (electric field strength during polarization of 1 kV/mm or more).

$YAlO_3$: 7.9 eV
$PrAlO_3$: 4.7 eV
$SmAlO_3$: 4.6 eV
$NdAlO_3$: 4.4 eV

On the other hand, $BaTiO_3$ (bandgap energy: 3.5 eV) having a perovskite structure had a surface potential of 4 V (electric field strength at the time of polarization of 1 kV/mm or more) when formed into a polycrystal having a thickness of 1 mm. By comparing these surface potentials, it was confirmed that the electret performance of the electret 1 containing the inorganic dielectric particles 21 in the electret layer 2 can be improved by using a composite oxide having a bandgap energy of 4 eV or more, such as rare earth aluminate.

Here, in Example 1, the LAO-based sintered powder constituting the inorganic dielectric particles 21 was pulverized so as to have the average particle size of about 50 μm, but the average particle size may be larger or smaller than 50 μm. The average particle size may be appropriately set within a range in which uniform dispersion is possible, depending on the thickness of the composite film and the like. Although polyimide was used as the organic material to be the base film 22 in Example 1, the present disclosure is not limited to this, and other organic materials or inorganic materials may be used for the base film 22.

Figure 3:
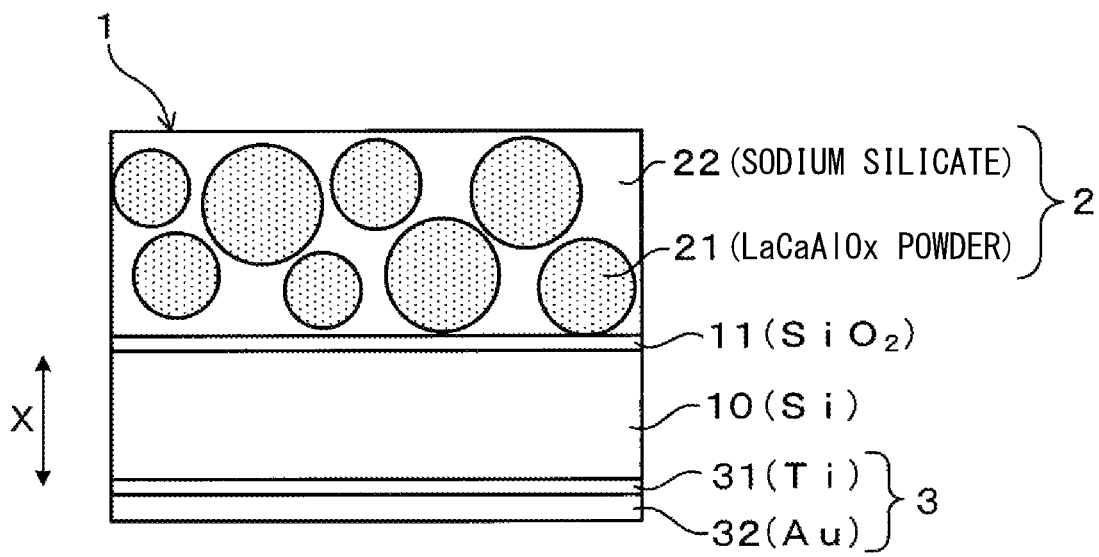
FIG. 3 is a schematic view showing another schematic configuration example of an electret and showing another example of a base film constituting an electret layer.

For example, as shown in FIG. 3, in the electret layer 2, the base film 22 for dispersing and holding the inorganic dielectric particles 21 can be made of sodium silicate, which is an inorganic material. In that case, a powder mixed solution for forming a composite film may be prepared by adding a sintered powder of $La_{0.99}Ca_{0.01}AlO_x$ to an inorganic solution containing sodium silicate as a base material in a predetermined ratio and mixing. Other configurations and manufacturing methods can be the same.

As described above, since the electret layer 2 is formed of the inorganic composite film by using sodium silicate, which is an inorganic material, the electret 1 can have a higher thermal stability.

Although conductive Si was used for the substrate 10, the present disclosure is not limited to this. The substrate 10 may be a conductive substrate using a conductive oxide or a metal such as aluminum, iron, and copper, or an insulating substrate using quartz glass, soda glass, or sapphire, PP (polypropylene), PET (polyethylene terephthalate), polycarbonate or the like. However, it is necessary to apply an electric field to the composite film to be the electret layer 2 at the time of polarization, and the conductive layer 3 is provided to one surface of the composite film in the thickness direction X in order to ground the one surface. In the present embodiment, the conductive layer 3 is provided on the lower surface of the substrate 10 and an electric field is indirectly applied, but the conductive layer 3 may be provided so as to be in direct contact with one surface of the composite film and grounded.

In this way, as shown in FIG. 2, the electret 1 having a configuration in which the electret layer 2 is disposed above the substrate 10 can be obtained. Further, as in the configuration shown in FIG. 1, the electret 1 may be in a state where the electret layer 2 is peeled off from the substrate 10. In that case, after forming the composite film to be the electret layer 2 above the substrate 10, the composite film may be peeled off from the substrate 10 and may be subjected to a polarization treatment, for example, by sandwiching the composite film between a pair of metal plates to be electrodes and directly applying a voltage from a direct-current power supply.

Alternatively, the polarization treatment may be performed in a state where the composite film to be the electret layer 2 is formed above the substrate 10, and then the electret layer 2 may be peeled off from the substrate 10 to obtain the electret 1. The electret 1 is obtained by peeling off the electret layer 2 from the substrate 10 in this way, and can be used by arranging the electret 1 at a desired position.

Second Embodiment

Figure 4:
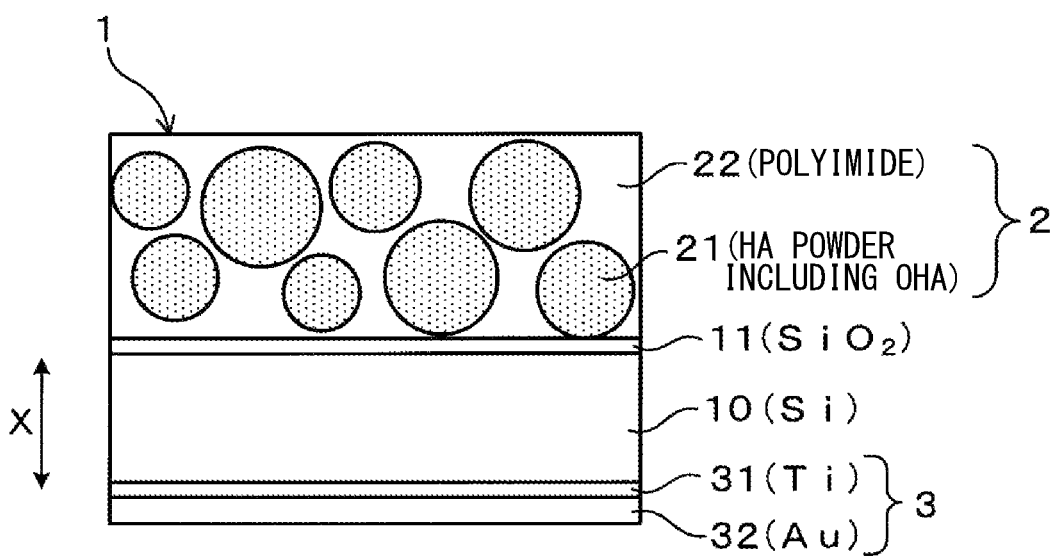
FIG. 4 is a schematic view showing another schematic configuration example of an electret and showing another example of inorganic dielectric particles constituting an electret layer.

An electret according to a second embodiment will be described with reference to FIG. 4. As shown in FIG. 4, a basic structure of the electret 1 of the present embodiment is the same as that of the first embodiment, and includes a substrate 10 and an electret layer 2 formed above a surface of the substrate 10. In the present embodiment, an inorganic dielectric material constituting inorganic dielectric particles 21 in the electret layer 2 is different from that in the first embodiment. Hereinafter, the differences will be mainly described. Incidentally, among reference numerals used in the second and subsequent embodiments, the same reference numerals as those used in the embodiment already described represent the same components as those in the embodiment already described, unless otherwise indicated.

Also in the present embodiment, the electret layer 2 has a structure in which the inorganic dielectric particles 21 mainly composed of an inorganic dielectric material having a bandgap energy of 4 eV or more are dispersed and held in a base film 22. In the first embodiment, the inorganic dielectric material is the composite oxide having the $ABO_3$ type perovskite structure, but in the present embodiment, an inorganic compound having an apatite structure containing phosphate ions and hydroxide ions is used.

Apatite is a general term for compounds represented by a composition formula $M_{10}(ZO_4)_6(X)_2$, typically has a crystal structure in which the unit cell is classified into the hexagonal system and the space group is $P6_3/m$, and often has a non-stoichiometric composition. The inorganic compound having an apatite structure containing phosphate ions and hydroxide ions is a compound represented by a composition formula $M_{10}(PO_4)_6(OH)_2$, and the metal element M includes divalent alkaline earth metal elements such as Ca.

Preferably, hydroxyapatite (HA) is used as the inorganic compound having the apatite structure containing phosphate ions and hydroxide ions. Hydroxyapatite has a composition formula of $(Ca_{10}(PO_4)_6(OH)_2)$ when satisfying stoichiometry, and has a crystal structure in which the unit cell is classified into the hexagonal system, and the space group is $P6_3/m$.

It is preferable that the inorganic compound used as the inorganic dielectric material has a hydroxide ion content in the apatite structure smaller than the stoichiometric ratio. Hydroxyapatite has a crystal structure of hexagonal hydroxyapatite, by sintering a raw material powder having hydroxide ions and phosphate ions, for example, at a temperature of more than 1250° C. and less than 1500° C., and in the process, the content of hydroxide ions becomes lower than the quantitative ratio. This is due to dehydration from the hydroxyl group caused by heating the hydroxyapatite, and oxyhydroxyapatite (OHA) is generated from the hydroxyapatite, and crystal defects occur.

In the present embodiment, the electret layer 2 uses the inorganic compound having the apatite structure such as hydroxyapatite as the inorganic dielectric material to be the inorganic dielectric particles 21. The inorganic compound is prepared into particles to form the inorganic dielectric particles 21 and a composite film in which the inorganic dielectric particles 21 are dispersed in the base film 22 is formed as the electret layer 2 above the substrate 10 to form the electret 1. A material of the substrate 10, a base material to be the base film 22, and a method of forming the composite film to be the electret layer 2 can be the same as those in the first embodiment.

Example 2

The electret 1 having the configuration shown in FIG. 4 was produced by the following method.

<Solution Preparation>

First, in order to form the composite film to be the electret layer 2, hydroxyapatite (HA) powder having a particle size of 50 to 60 μm was used as a raw material for an inorganic dielectric material, and was sintered by heating at 1400° C. for 2 hours and dehydrated to obtain a sintered powder including oxyhydroxyapatite (OHA) (hereinafter referred to as HA sintered powder including OHA). At this time, since the powder size is increased by sintering, the powder is sufficiently pulverized so that the particle size after pulverization is about 20% smaller than that before sintering, and the obtained sintered powder was used as the inorganic dielectric particles 21.

Next, as a raw material for the base material to be the base film 22, organic mixed solution of N-methyl-2-pyrrolidone and polyamic acid was prepared so that the polyamic acid concentration was about 6%. The HA sintered powder including OHA was added to the organic mixed solution in an amount of 30% by mass and mixed to prepare a powder mixed solution for forming the composite film.

<Film Formation>

The upper surface of the substrate 10 made of conductive Si was thermally oxidized to form the Si oxide film 11 having a film thickness of 50 nm. Next, the conductive layer 3 was formed on the lower surface of the substrate 10 by a sputtering method. The conductive layer 3 was formed by forming a Ti film of 30 nm, which is the first conductive layer 31, and an Au film of 200 nm, which is the second conductive layer 32, in order from the side in contact with the substrate 10, using metal materials forming respective layers as targets.

Next, the powder mixed solution prepared as described above was applied to an upper surface of the Si oxide film 11 on the substrate 10 by a printing method so as to have a thickness of about 160 μm. When the HA sintered powder including OHA precipitates downward after application, the organic mixed solution in the upper layer without the HA sintered powder including OHA was removed, if necessary. The volume ratio of the HA sintered powder including OHA after the formation of the electret layer 2 was 70% by volume.

Then, the substrate 10 applied with the powder mixed solution was dried at 110° C. for 15 minutes in an air atmosphere. Further, the polyamic acid was made polyimide by heat treatment at 280° C. for 1 hour. As a result, an organic-inorganic composite film in which the inorganic dielectric particles 21 made of the HA sintered powder including OHA were surrounded and held by the base material made of polyimide (thermal decomposition temperature ≥500° C.) and uniformly dispersed in the base film 22 was formed. The temperature rising rate during the heat treatment was 3° C./min.

<Polarization Treatment>

The organic-inorganic composite film to be the electret layer 2 was formed above the substrate 10 as described above and was subjected to a polarization treatment to obtain the electret 1. A corona discharge is used for the polarization treatment, the conductive layer 3 in contact with the lower surface of the substrate 10 is grounded to be a ground electrode, a corona discharge electrode is arranged on the upper surface of the electret layer 2 and a voltage is applied between the electrodes to cause the corona discharge. The conditions for the corona discharge were as follows. The voltage was applied and the corona discharge was continued even when the temperature was lowered.

Discharge voltage: −6 kV
Temperature: 200° C.
Processing time: 1 hour

In the electret 1 of Example 2, the HA-based inorganic dielectric material (HA including OHA) constituting the inorganic dielectric particles 21 had a bandgap energy of 7 eV or more, which was larger than a bandgap energy of 4 eV. Further, the surface potential of the polarized electret layer 2 (thickness 160 μm) was 1.3 kV, and it was confirmed that a high surface potential was obtained even when the composite film in which the inorganic dielectric particles 21 were dispersed in the base film 22 was formed.

Even in this way, as in the first embodiment, the electret layer 2 having electret performance can be obtained by polarizing the organic-inorganic composite film formed above the substrate 10 and negatively charging the upper surface side. Also this case, a high surface potential depending on the polarization treatment conditions can be obtained, and stable electret performance can be realized.

The present disclosure is not limited to the embodiments described above, and various modifications may be adopted within the scope of the present disclosure without departing from the spirit of the disclosure.

What is claimed is:

1. An electret comprising an electret layer, wherein
the electret layer is formed by subjecting a composite film in which inorganic dielectric particles are dispersed and held in a base film to a polarization treatment, and
the inorganic dielectric particles are mainly composed of an inorganic dielectric material having a bandgap energy of 4 eV or more.

2. The electret according to claim 1, further comprising a substrate, wherein
the electret layer is formed above a surface of the substrate.

3. The electret according to claim 1, wherein
the inorganic dielectric material is a composite oxide having an $ABO_3$ type perovskite structure containing two different metal elements A and B.

4. The electret according to claim 3, wherein
in the composite oxide, an A site of the perovskite structure is occupied by a rare earth element R selected from the group consisting of La, Y, Pr, Sm and Nd, and a B site of the perovskite structure is occupied by Al.

5. The electret according to claim 4, wherein
in the composite oxide, at least one of the metal elements A and B is partially substituted with a dopant element composed of a different metal element,
the dopant element that substitutes for the metal element A is an alkaline earth metal element, and
the dopant element that substitutes for the metal element B is one or more element selected from the group consisting of alkaline earth metal elements and Zn.

6. The electret according to claim 5, wherein
a substitution ratio of the dopant element that substitutes for the metal element A is 0.5 atomic % to 20 atomic %, and
a substitution ratio of the dopant element that substitutes for the metal element B is 0.5 atomic % to 20 atomic %.

7. The electret according to claim 1, wherein
the inorganic dielectric material is an inorganic compound having an apatite structure containing phosphate ions and hydroxide ions.

8. The electret according to claim 1, wherein
the base film has a dielectric breakdown electric field strength higher than an electric field strength during the polarization treatment and is made of a material that is stable at a temperature during the polarization treatment.

9. The electret according to claim 1, wherein
a content of the inorganic dielectric particles in the composite film is 30% by volume or more and 75% by volume or less.

* * * * *